US012035406B2

(12) United States Patent
Guo

(10) Patent No.: US 12,035,406 B2
(45) Date of Patent: Jul. 9, 2024

(54) METHOD AND DEVICE FOR BEAM DETERMINATION FOR DRX, UE AND NETWORK DEVICE

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 358 days.

(21) Appl. No.: 17/559,286

(22) Filed: Dec. 22, 2021

(65) Prior Publication Data

US 2022/0117031 A1 Apr. 14, 2022

Related U.S. Application Data

(63) Continuation of application No. PCT/CN2020/108134, filed on Aug. 10, 2020.

(Continued)

(51) Int. Cl.
*H04W 56/00* (2009.01)
*H04W 16/28* (2009.01)
(Continued)

(52) U.S. Cl.
CPC ........... *H04W 76/28* (2018.02); *H04W 16/28* (2013.01); *H04W 72/0446* (2013.01);
(Continued)

(58) Field of Classification Search
CPC ... H04W 76/28; H04W 72/542; H04W 72/23; H04W 16/28; H04W 72/0446; H04W 72/72046
(Continued)

(56) References Cited

U.S. PATENT DOCUMENTS

| 11,838,090 B2* | 12/2023 | Liu | H04B 7/024 |
| 2014/0254538 A1* | 9/2014 | Park | H04W 56/00 370/329 |

(Continued)

FOREIGN PATENT DOCUMENTS

| CN | 109891773 A | 6/2019 |
| WO | 2018160969 A1 | 9/2018 |
| WO | 2018208219 A1 | 11/2018 |

OTHER PUBLICATIONS

"Quan, System And Method For Link Recovery For Discontinuous Reception, Feb. 12, 2021, CN 112368954" (Year: 2019).*

(Continued)

*Primary Examiner* — Sai Ming Chan
(74) *Attorney, Agent, or Firm* — Ladas & Parry LLP

(57) ABSTRACT

A method and device for beam determination for Discontinuous reception (DRX), User Equipment (UE) and a network device are provided. The method includes that: the UE measures a plurality of Channel state information reference signal (CSI-RS) resources in a given slot in a DRX on duration; and the UE determines, based on measurement quantities, at least one of a transmitting beam for a Physical Downlink Control Channel (PDCCH) or a transmitting beam for a Physical Uplink Control Channel (PUCCH).

20 Claims, 7 Drawing Sheets

Related U.S. Application Data

(60) Provisional application No. 62/885,670, filed on Aug. 12, 2019.

(51) Int. Cl.
*H04W 72/044* (2023.01)
*H04W 72/0446* (2023.01)
*H04W 72/23* (2023.01)
*H04W 72/542* (2023.01)
*H04W 76/28* (2018.01)

(52) U.S. Cl.
CPC ......... *H04W 72/046* (2013.01); *H04W 72/23* (2023.01); *H04W 72/542* (2023.01)

(58) Field of Classification Search
USPC ........................................................ 370/329
See application file for complete search history.

(56) References Cited

U.S. PATENT DOCUMENTS

| | | |
|---|---|---|
| 2018/0131434 A1 | 5/2018 | Islam et al. |
| 2018/0255607 A1 | 9/2018 | Nagaraja et al. |
| 2020/0128455 A1 | 4/2020 | Da Silva et al. |
| 2020/0314749 A1 * | 10/2020 | Sarkis ................... H04L 5/0092 |
| 2022/0039009 A1 * | 2/2022 | Iyer ........................ H04L 5/0098 |
| 2022/0078766 A1 * | 3/2022 | Li ........................... H04B 7/088 |
| 2023/0389113 A1 * | 11/2023 | Park ....................... H04W 76/15 |

OTHER PUBLICATIONS

"Nilsson, UE Reporting Aggregated Channel State Information Based on Multiple P3 Sweeps, Jan. 12, 2022, EP 3711188" (Year: 2017).*

"Cai, Method And Device Of Physical Downlink Control Channel Monitor In Wireless Communication, Oct. 1, 2019, CN 110300433" (Year: 2019).*

Qualcomm Incorporated. "Beam management in C-DRX", 3GPP TSG-RAN WG2 Meeting #101 R2-1803030, Mar. 2, 2018 (Mar. 2, 2018), section 2.

Ericsson. "Remaining details on measurements for mobility management", 3GPP TSG-RAN WG##91 R1-1720942, Dec. 1, 2017 (Dec. 1, 2017), the whole document.

International Search Report in the international application No. PCT/CN2020/108134, mailed on Nov. 13, 2020.

Written Opinion of the International Search Authority in the international application No. PCT/CN2020/108134, mailed on Nov. 13, 2020.

* cited by examiner

METHOD AND DEVICE FOR BEAM DETERMINATION FOR DRX, UE AND NETWORK DEVICE

CROSS-REFERENCE TO RELATED APPLICATION

The application is a continuation of International Application No. PCT/CN2020/108134 filed on Aug. 10, 2020, which claims priority and rights to U.S. Provisional Application No. 62/885,670 filed on Aug. 12, 2019. The contents of these applications are incorporated by reference herein in their entirety.

BACKGROUND

At present, in the related arts, beam management methods do not provide any beam alignment for a User Equipment (UE) in Discontinuous Reception (DRX) mode operation. When the UE enters a DRX On period, a beam pair link used for a Physical Downlink Control Channel (PDCCH) could be totally out-of-date after a long DRX off period due to, for example, movement of the UE.

SUMMARY

The embodiments of the present disclosure relate to a field of mobile communication technologies, and provide a method and device for beam determination for DRX, a UE and a network device.

In a first aspect, the embodiments of the present disclosure provide a method for beam determination for DRX, which includes the following operations.

A UE measures multiple Channel State Information Reference Signal (CSI-RS) resources in a given slot m a DRX on duration.

The UE determines, based on measurement quantities, at least one of a transmitting beam for a PDCCH or a transmitting beam for a Physical Uplink Control Channel (PUCCH).

In a second aspect, the embodiments of the present disclosure provide a method for beam determination for DRX, which includes the following operations.

A network device transmits multiple CSI-RS resources in a given slot in a DRX on duration. Here, measurement quantities of the multiple CSI-RS resources are used by a UE to determine at least one of a transmitting beam for a PDCCH or a transmitting beam for a PUCCH.

In a third aspect, the embodiments of the present disclosure provide a device for beam determination for DRX, which includes a measurement unit and a determination unit.

The measurement unit is configured to measure multiple CSI-RS resources in a given slot in a DRX on duration.

The determination unit is configured to determine, based on measurement quantities, at least one of a transmitting beam for a PDCCH or a transmitting beam for a PUCCH.

In a fourth aspect, the embodiments of the present disclosure provide a device for beam determination for DRX, which includes a sending unit.

The sending unit is configured to transmit multiple CSI-RS resources in a given slot in a DRX on duration. Here, measurement quantities of the multiple CSI-RS resources are used by a UE to determine at least one of a transmitting beam for a PDCCH or a transmitting beam for a PUCCH.

In a fifth aspect, the embodiments of the present disclosure provide a UE, which includes a processor and a memory. The memory is configured to store computer programs, and the processor is configured to call and execute the computer programs in the memory to perform the method for beam determination for DRX in the first aspect.

In a sixth aspect, the embodiments of the present disclosure provide a network device, which includes a processor and a memory. The memory is configured to store computer programs, and the processor is configured to call and execute the computer programs in the memory to perform the method for beam determination for DRX in the second aspect.

In a seventh aspect, the embodiments of the present disclosure provide a chip, which is for implementing the method for beam determination for DRX in the first or second aspect.

Specifically, the chip includes a processor configured to call and execute computer programs in a memory to enable a device equipped with the chip to perform the method for beam determination for DRX in the first or second aspect.

In an eighth aspect, the embodiments of the present disclosure provide a computer-readable storage medium, configured to store computer programs that, when executed by a computer, cause the computer to perform the method for beam determination for DRX in the first or second aspect.

In a ninth aspect the embodiments of the present disclosure provide a computer program product, which includes computer program instructions that, when executed by a computer, cause the computer to perform the method for beam determination for DRX in the first or second aspect.

In a tenth aspect, the embodiments of the present disclosure provide a computer program that, when being run on a computer, cause the computer to perform the method for beam determination for DRX in the first or second aspect.

BRIEF DESCRIPTION OF THE DRAWINGS

The drawings described herein are used to provide a further understanding of the present disclosure and form a part of the present disclosure. The schematic embodiments and descriptions of the present disclosure are used to explain the present disclosure and do not constitute an undue limitation on the present disclosure. In the drawings.

DETAILED DESCRIPTION

The technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall hill within the scope of protection of the present disclosure.

The technical solutions of the embodiments of the present disclosure may be applied to various communication systems, for example, a Long Term Evolution (LTE) system, a LTE Frequency Division Duplex (FDD) system, a LTE Time Division Duplex (TDD) system, a 5th Generation (5G) communication system or a future communication system.

Figure 1:
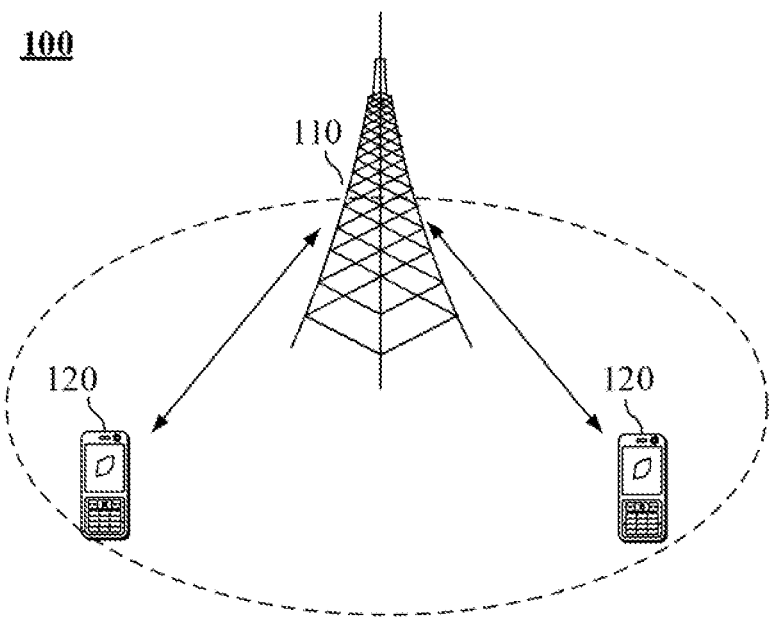
FIG. 1 is a diagram of architecture of a communication system according to the embodiments of the present disclosure.

FIG. 1 is a diagram of architecture of a communication system 100 used by the embodiments of the present disclosure. The communication system 100 may include a network device 110. The network device 110 may be a device that communicates with a terminal 120 (or called a communication terminal or terminal). The network device 110 may provide communication coverage for a specific geographic area, and may communicate with terminals within the coverage area. Optionally, the network device 110 may be an Evolutional Node B (eNB or eNodeB) in an LTE system or a wireless controller in a Cloud Radio Access Network (CRAN); or the network device may be a mobile switching center, a relay station, an access point, a vehicle-mounted device, a wearable device, a hub, a switch, a network bridge, a router, a network-side device in a 5G network, or a network device in a future communication system etc.

The communication system 100 may also include at least one terminal 120 within the coverage of the network device 110. The terminal used herein may include, but is not limited to, a device that is configured to receive/transmit communication signals via a wired connection (such as via a Public Switched Telephone Networks (PSTN), Digital Subscriber Line (DSL), digital cable, direct cable connection, and/or another data connection/network) and/or via a wireless interface with, for example, a cellular network, a Wireless Local Area Network (WLAN), a Digital TV network such as Digital Video Broadcasting Handheld (DVB-H) network, a satellite network, an Amplitude Modulation (AM)-Frequency Modulation (FM) broadcast transmitter and/or another communication terminal; and/or an Internet of Things (IoT) device. A terminal configured to communicate over a wireless interface may be called "a wireless communication terminal", "a wireless terminal" or "a mobile terminal". Examples of the mobile terminal may include, but are not limited to, a satellite or cellular phone; a personal communications system (PCS) terminal that can combine a cellular radio telephone with data processing, facsimile, and data communication capabilities; a Personal Digital Assistant (PDA) that can include a radiotelephone, a pager, an Internet/intranet access, a Web browser, a notebook, calendar and/or a Global Positioning System (GPS) receiver; and a conventional laptop and/or palmtop receiver, or other electronic devices including radiotelephone transceivers. The terminal may be an access terminal, User Equipment (UE), a user unit, a user station, a mobile station, a mobile platform, a remote station, a remote terminal, a mobile device, a user terminal, a terminal, a wireless communication device and a user proxy or user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal in a 5G network, or a terminal in a future evolved Public Land Mobile Network (PLMN).

Optionally, a direct device to Device (D2D) communication may be performed between the terminals 120.

Optionally, the 5G communication system or 5G network may also be called a New Radio (NR) system or NR network.

FIG. 1 exemplarily illustrates one network device and two terminals. Optionally, the communication system 100 may include multiple network devices and other numbers of terminals may be within the coverage of each network device. This is not limited in the embodiments of the present disclosure.

Optionally, the communication system 100 may further include other network entities such as a network controller, a mobility management entity and the like. This is not limited in the embodiments of the present disclosure.

It should be understood that in the embodiments of the present disclosure, the device having a communication function in the network/system may be called a communication device. Taking the communication system 100 illustrated in FIG. 1 as an example, a communication device may include a network device 110 and a terminal 120 having a communication function; and the network device 110 and the terminal 120 may be specific devices described above, and are not described herein again. The communication device may also include other devices in the communication system 100, such as other network entities such as a network controller and a mobile management entity, which are not limited in the embodiments of the present disclosure.

It should be understood that the terms "system" and "network" in the present disclosure are usually used interchangeably. The term "and/or" in the present disclosure is only an association relationship describing associated objects and represents that three relationships may exist. For example A and/or B may represent three conditions: i.e., independent existence of A, existence of both A and B and independent existence of B. In addition, character "/" in the present disclosure usually represents that previous and next associated objects form an "or" relationship.

For better understanding of the technical solutions of the embodiments of the present disclosure, the technical solutions related to the embodiments of the present disclosure are described in more detail below.

To reduce device power consumption, NR includes mechanisms for DRX. In DRX, a UE is configured with a DRX cycle and each DRX cycle contains one DRX on duration (On duration). The UE monitors a PDCCH only when the UE is within a periodic DRX On duration. In NR, the DRX is configured with the following Radio Resource Control (RRC) parameters.

*drx-onDurationTimer*: it defines a length of a DRX On duration at the beginning of a DRX Cycle. Its value can be 1, 2, 3, 4, 5, 6, 8, 10, 20, 30, 40, 50, 60, 80, 100, 200, 300, 400, 500, 600, 800, 1000 or 2000 milliseconds.

*drx-SlotOffset*: a delay before starting the *drx-onDurationTimer*.

*drx-InactivityTimer*: a duration after a PDCCH occasion in which a PDCCH indicates a new Uplink (UL) or Downlink (DL) transmission for a Media Access Control (MAC)

entity; its value can be 0, 1, 2, 3, 4, 5, 6, 8, 10, 20, 30, 40, 50, 60, 80, 100, 200, 300, 400, 500, 750, 1280, 1920 or 2560 milliseconds.

*drx-RetransmissionTimerDL* (per DL Hybrid Automatic Repeat request (HARQ) process except for a broadcast process): a maximum duration until a DL retransmission is received; it defines the maximum number of slots the UE shall continue monitoring PDCCH for DL retransmission. Its value is configured in terms of slots. Example value can be 10, 11, 12, 14 or 1320 slots.

*drx-RetransmissionTimerUL* (per UL HARQ process): a maximum duration until a grant for UL retransmission is received; it defines the maximum number of slots the UE shall continue monitoring PDCCH for a UL grant for UL retransmission. Its value is provided in terms of slots.

*drx-LongCycleStartOffset*: a Long DRX cycle and *drx-StartOffset* which defines a subframe where the Long and Short DRX Cycle starts; it provides a periodicity and starting offset for the long DRX cycle. The periodicity for long DRX can be 10, 20, 32, 40, 60, 64, 70, 80, 128, 160, 256, 320, 512, 640, 1024, 1280, 2048, 2560, 5120, or 10240 milliseconds.

*drx-ShortCycle* (optional): a Short DRX cycle.

*drx-ShortCycleTimer* (optional): a duration the UE shall follow the Short DRX cycle.

*drx-HARQ-RTT-TimerDL* (per DL HARQ process except for the broadcast process): a minimum duration before a DL assignment for HARQ retransmission is expected by the MAC entity.

*drx-HARQ-RTT-TimerUL* (per UL HARQ process): a minimum duration before UL HARQ retransmission grant is expected by the MAC entity.

NR specifies the following methods for multi-beam operation: beam measurement and reporting, beam indication and beam switch. In downlink beam measurement and reporting, a UE is configured to measure multiple CSI-RS resources or Synchronization signal or Physical Broadcast Channel (SS/PBCH) blocks. Each CSI-RS resource or SS/PBCH block can represent one gNB Transmitting transmission (Tx) beam. The UE measures those CSI-RS resources or SS/PBCH blocks and then reports up to 4 CSI-RS resources or SS/PBCH blocks selected from those measured reference signal resources. The beam measurement and reporting is used to assist the gNB to select Tx beam for PDCCH and PDSCH transmission. For a UE with beam correspondence capability, the downlink beam measurement and reporting can also help the UE to select UE Tx beam for transmitting, PUCCH and PUSCH.

To indicate a Tx beam used for PDCCH transmission, a CORESET is configured with a Transmission Configuration Indicator (TCI) state and the TCI state contains a parameter for configuring a Quasi Co-Location (QCL) relationship between one or two downlink reference signals and DM-RS ports of the PDCCH. In the TCI state, one DL RS is given to provide QCL-Type D (i.e., spatial Receiving/reception (Rx) parameter) for the DM-RS ports of the PDCCH. The DL RS providing QCL-Type D is used to indicate which Tx beam is used for the PDCCH transmission in a CORESET and then the UE can derive a Rx beam for receiving the PDCCH according to the DL RS configured to provide QCL-Type D.

The current beam management methods do not provide any beam alignment for a UE in a DRX mode operation. When the UE enters a DRX On period, a beam pair link used for a PDCCH could be totally out-of-date after a long DRX off period for example due to UE movement. For example, a periodicity of a long DRX cycle can be more than 1 second (the value for the periodicity of the long DRX cycle can be 1024, 1280, 2048, 2560, 5120 or 10240 milliseconds, as specified in NR release 15). After the UE sleeps for more than 1 second, the beam pair link obtained more than 1 second would be totally misaligned. Thus, a connection on a PDCCH channel between the gNB and the UE is lost. Based on the current methods, the UE would have to enter a radio link failure recovery procedure to re-establish a RRC connection. It causes great latency and signaling overhead to UE operation in the DRX mode.

Furthermore, some types of NR UEs, for example, smart watch, can be configured with a DRX mode with a long DRX cycle and a short DRX On duration. The current beam management methods are not able to support a low-latency and quick beam alignment during the short DRX On duration, however, which is necessary for the operation of those UEs.

To this end, the following technical solutions of the embodiments of the present disclosure are proposed.

In the present disclosure, methods of multi-beam operation for a UE in a DRX mode operation are presented. In one method, the UE is configured with a set of aperiodic CSI-RS resources that is associated with DRX mode configuration. The CSI-RS resources in that set are triggered to be transmitted in a first slot of each DRX on duration. Each CSI-RS resource is associated with a Random Access Channel (RACH) occasion and a RACH preamble index. The UE measures the CSI-RS resources and transmits a RACH preamble corresponding to one selected CSI-RS resource. After that, the UE can assume that a UE-specific CORESET is QCLed to the selected CSI-RS resource and UE-specific PUCCH resources are spatial related to the CSI-RS resource. Another method is that a set of CSI-RS resources with parameter "repetition" On is associated with the DRX configuration. That set of CSI-RS resources are transmitted at the beginning of each DRQ on duration. The U E can use that set to train a Rx beam and then use the best Rx beam to receive downlink transmission and transmit uplink transmission during the given DRX On duration.

The technical solutions of the embodiments of the present disclosure will be described in detail below.

Figure 2:
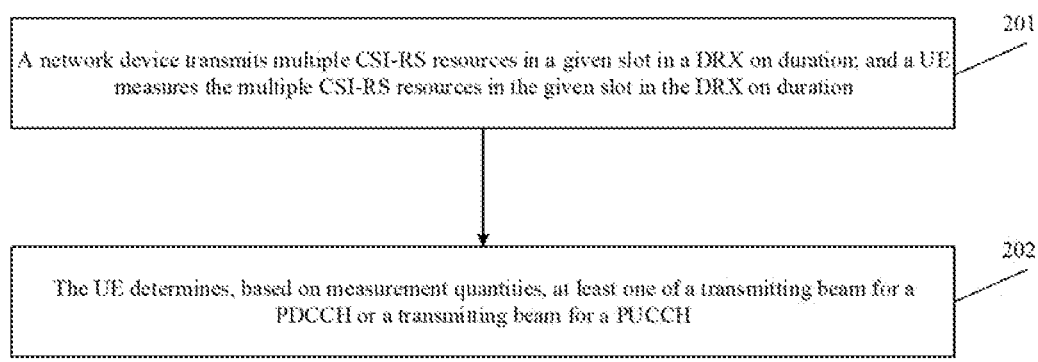
FIG. 2 is a flowchart of a method for beam determination for DRX according to the embodiments of the present disclosure.

FIG. 2 is a flowchart of a method for beam determination for DRX according to the embodiments of the present disclosure. As illustrated in FIG. 2, the method for beam determination for DRX includes the following operations.

In block 201, a network device transmits multiple CSI-RS resources in a given slot in a DRX on duration; and a UE measures the multiple CSI-RS resources in the given slot in the DRX on duration.

In an embodiment, the network device transmits first configuration information and second configuration information to the UE, and the UE receives the first configuration information and the second configuration information from the network device; the first configuration information is used to determine a DRX configuration and the second configuration information is used to determine configuration of the multiple CSI-RS resources, here, the DRX configuration includes configuration of a long DRX cycle and the long DRX cycle is associated with the multiple CSI-RS resources.

The UE determines, based on the DRX configuration, a time for sleep and a time for Monitoring a PDCCH. Here, the time for monitoring the PDCCH can also be called the DRX on duration. The UE measures the multiple CSI-RS resources in the given slot in the DRX on duration, here, measurement quantities of the multiple CSI-RS resources are used by the UE to determine at least one of a transmitting beam for the PDCCH or a transmitting beam for a PUCCH, which can refer to the following block 202.

In an embodiment, the given slot can be configured by the network device, or preconfigured, or specified by a protocol.

In an embodiment, the given slot is a first slot in the DRX on duration.

In an embodiment, before the UE measures the multiple CSI-RS resources in the given slot in the DRX on duration, the method further includes the following operations.

The network device transmits a first Downlink Control information (DCI) format to the UE, and the UE receives the first DCI format. Here, the first DCI format indicates that the multiple CSI-RS resources are transmitted in the DRX duration.

It should be noted that if the UE receives the first DCI format, then the UE measures the multiple CSI-RS resources in the given slot in the DRX on duration; if the UE does not receive the first DCI format, then the UE does not measure the multiple CSI-RS resources in the given slot in the DRX on duration.

Here, the first DCI format may be a specific DCI format, for example, DCI format X.

In an embodiment, the network device is a base station, e.g., gNB. Here, the gNB is a current gNB serving the UE, so the gNB is also called a serving gNB.

In block 202, the UE determines, based on measurement quantities, at least one of a transmitting beam for a PDCCH or a transmitting beam for a PUCCH.

In an embodiment, the UE determines, based on the measurement quantities, the at least one of the transmitting beam for the PDCCH or the transmitting beam for the PUCCH, which is achieved through any one of the following manners.

Manner 1: the multiple CSI-RS resources correspond to different transmitting beams. Each of the multiple CSI-RS resources is associated with a Physical Random Access Channel (PRACH) preamble and a PRACH resource occasion. Based on this, the UE selects, based on the measurement quantities, a first CSI-RS resource from the multiple CSI-RS resources, here, the first CSI-RS resource is associated with a first PRACH preamble and a first PRAM resource occasion; and the UE transmits the first PRACH preamble on the first PRACH resource occasion and determines at least one of: the transmitting beam for the PDCCH is the same as a transmitting beam for the first CSI-RS resource, or, the transmitting beam for the PUCCH is the same as a transmitting beam for the first PRACH preamble.

In an embodiment the UE selects a CSI-RS resource with a highest signal quality from the multiple CSI-RS resources as the first CSI-RS resource. Here, the signal quality may be, for example, Reference Signal Received Power (RSRP).

For a network side, the network device receives the first PRACH preamble transmitted by the UE on the first PRACH resource occasion, here, the first PRACH resource occasion and the first PRACH preamble are associated with the first CSI-RS resource of the multiple CSI-RS resources; and the network device determines at least one of: the transmitting beam for the PDCCH is the same as a transmitting beam for the first CSI-RS resource, or, the transmitting beam for the PUCCH is the same as a transmitting beam for the first PRACH preamble.

Manner 2: the multiple CSI-RS resources correspond to a same transmitting beam.

The UE measures, through beam sweeping, the multiple CSI-RS resources in the given slot in the DRX on duration, here, the beam sweeping indicates that the UE receives different CSI-RS resources through different receiving beams among multiple receiving beams. Based on this, the UE selects, based on the measurement quantities, a first receiving beam from the multiple receiving beams; and the UE determines at least one of: the transmitting beam for the PDCCH is the same as the transmitting beam for the multiple CSI-RS resources, or, the transmitting beam for the PUCCH corresponds to the first receiving beam.

In an embodiment, the UE selects a receiving beam with a highest signal quality from the multiple receiving beams as the first receiving beam. Here, the signal quality may be, for example, RSRP.

For the network side, the network device determines at least one of: the transmitting beam for the PDCCH is the same as the transmitting beam for the multiple CSI-RS resources, or, the transmitting beam for the PUCCH corresponds to the transmitting beam for the multiple CSI-RS resources. Here, it should be noted that the transmitting beam for the PUCCH corresponds to a receiving beam for the PUCCH and the receiving beam for the PUCCH corresponds to the transmitting beam for the multiple CSI-RS resources, and thus the transmitting beam for the PUCCH corresponds to the transmitting beam for the multiple CSI-RS resources.

The technical solutions proposed in the present disclosure can provide low-latency and quick beam alignment for a UE in a DRX mode operation during each DRX on duration. Moreover, the technical solutions improve link reliability for the UE in the DRX mode operation in Frequency Range 2 (FR2) New Radio (NR) systems, and reduce possibility of a beam link failure for the UE in a DRX mode.

The technical solutions of the embodiments of the present disclosure will be describer below in conjunction with specific application examples.

FIRST EXAMPLE

A UE is configured with a DRX configuration and is configured with a first CSI-RS resource set that can contain k (k≥1) CSI-RS resources. The first CSI-RS resource set is configured to be associated with the DRX configuration provided to the LT. In the DRX configuration, the UE is provided with a periodicity of a DRX cycle and a length of a DRX on duration. According the DRX configuration, the UE can sleep within the DRX cycle and the UE monitors PDCCH transmission in slot(s) during the DRX on duration in each DRX cycle period. For the first CSI-RS resource set, the UE is provided with:

The CSI-RS resources in the first CSI-RS resource set are transmitted in one particular slot in every DRX on duration, in one example, the UE can be configured that the CSI-RS resources in the first CSI-RS resource set are transmitted in a first slot in each DRX on duration.

Each CSI-RS resource in the first CSI-RS resource set is associated with a PRACH preamble and a PRACH resource. The UE can be configured that the associated PRACH resource happens in one particular slot in ever DRX on duration. For example, the PRACH resource happens in the N-th slot in each DRX on duration.

Within one DRX on duration, the UE can first measure the CSI-RS resources in the first CSI-RS resource set which are transmitted in a pre-configured slot. The UE can select one of those CSI-RS resources and then transmit the PRACH preamble associated with the selected CSI-RS resource in the configured PRACH resource to a serving gNB. After transmitting the preamble, the UE can start to assume that the PDCCH transmission is quasi co-located with the selected CSI-RS resource for QCL-type D, i.e., the UE can start to assume that the gNB uses a Tx beam applied on transmission of the selected CSI-RS resource to transmit PDCCH. The UE can assume to start to use a UE Tx beam that is applied on transmission of the PRACH preamble to transmit PUCCH. This method enables the UE to quickly train a downlink beam pair link at the beginning of each DRX on duration and then align the Tx beam and Rx beam with the gNB for PDCCH transmission with low latency and low overhead.

Figure 3:
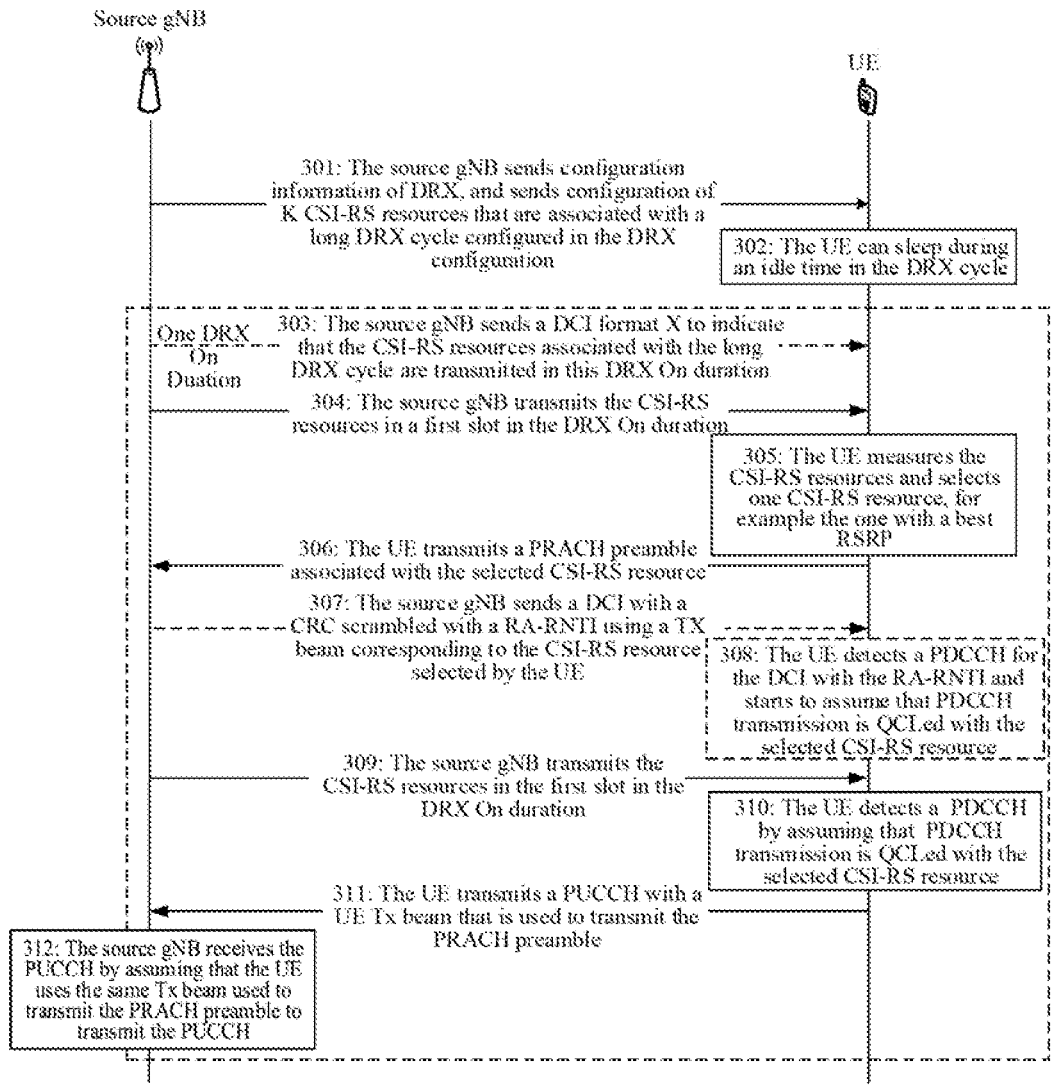
FIG. 3 is a flowchart of a beam alignment procedure for a UE configured with DRX according to the embodiments of the present disclosure.

FIG. 3 is a flowchart of a beam alignment procedure for a UE configured with DRX according to the embodiments of the present disclosure. As illustrated in FIG. 3, the procedure includes the following operations.

In 301: a source gNB sends configuration information of DRX, and sends configuration. K CSI-RS resources that are associated with a long DRX cycle configured in the DRX configuration.

In 302: the UE can sleep during an idle time in the DRX cycle.

In 303: the source gNB sends a DCI format X to indicate that the CSI-RS resources associated with the long DRX cycle are transmitted in the DRX on duration.

In 304: the source gNB transmits the CSI-RS resources in a first slot in the DRX on duration.

In 305: the UE measures the CSI-RS resources and selects one CSI-RS resource, for example the one with a best RSRP.

In 306: the UE transmits a PRACH preamble associated with the selected CSI-RS resource.

In 307: the source gNB sends a DCI with a Cyclic Redundancy Check (CRC) scrambled with a Random Access-Radio Network Temporary identity (RA-RNTI) using a TX beam corresponding to the CSI-RS resource selected by the UE.

In 308: the UE detects a PDCCH for the DCI with the RA-RNTI and starts to assume that PDCCH transmission is QCLed with the selected CSI-RS resource.

In 309: the source gNB transmits the CSI-RS resources in the first slot in the DRX on duration.

In 310: the UE detects a PDCCH by assuming that PDCCH transmission is QCLed with the selected CSI-RS resource.

In 311: the UE transmits a PUCCH with a UE Tx beam that is used to transmit the PRACH preamble.

In 312: the source gNB receives the PUCCH by assuming that the UE uses the same Tx beam used to transmit the PRACH preamble to transmit the PUCCH.

As illustrated in FIG. 3, the serving gNB (i.e., the source gNB) sends the configuration of DRX to the UE. The configuration of DRX includes configuration of the long DRX cycle. The serving gNB can also configure an association between the long DRX cycle and CSI-RS resources to the UE. For each of those CSI-RS resources, the serving gNB can configure a PRACH preamble and a PRACH resource occasion for the CSI-RS resource. An example for configuration of DRX and associated CSI-RS resources is illustrated in Table 1 below.

TABLE 1

| | |
|---|---|
| DRX-Config ::= | SEQUENCE { |
| drx-onDurationTimer | CHOICE { |
| | subMilliSeconds INTEGER (1..31), |
| | milliSeconds ENUMERATED { |
| ms10, ms20, ms30, ms40, ms50, ms60, | ms1, ms2, ms3, ms4, ms5, ms6, ms8, |
| ms500, ms600, ms800, ms1000, ms1200, | ms80, ms100, ms200, ms300, ms400, |
| spare5, spare4, spare3, spare2, spare1 } | ms1600, spare8, spare7, spare6, |
| | }, |
| drx-InactivityTimer | ENUMERATED { |
| ms10, ms20, ms30, ms40, ms50, ms60, ms80, | ms0, ms1, ms2, ms3, ms4, ms5, ms6, ms8, |
| ms1280, ms1920, ms2560, spare9, spare8, | ms100, ms200, ms300, ms500, ms750, |
| spare2, spare1}, | spare7, spare6, spare5, spare4, spare3, |
| drx-HARQ-RTT-TimerDL | INTEGER (0..56), |
| drx-HARQ-RTT-TimerUL | INTEGER (0..56), |
| drx-RetransmissionTimerDL | ENUMERATED { |
| | sl0, sl1, sl2, sl4, sl6, sl8, sl16, |
| sl24, sl33, sl40, sl64, sl80, sl96, sl112, sl128, | sl160, sl320, spare15, spare14, spare13, |
| spare12, spare11, spare10, spare9, | spare8, spare7, spare6, spare5, spare4, |
| spare3, spare2, spare1}, | |
| drx-RetransmissionTimerUL | ENUMERATED { |
| | sl0, sl1, sl2, sl4, sl6, sl8, sl16, |
| sl24, sl33, sl40 sl64, sl80, sl96, sl112, sl128, | sl160, sl320, spare15, spare14, spare13, |
| spare12, spare11, spare10, spare9, | spare8, spare7, spare6, spare5, spare4, |
| spare3, spare2, spare1 }, | |
| drx-LongCycleStartOffset | CHOICE { |
| ms10 | INTEGER(0..9), |
| ms20 | INTEGER(0..19), |
| ms32 | INTEGER(0..31), |
| ms40 | INTEGER(0..39), |
| ms60 | INTEGER(0..59), |
| ms64 | INTEGER(0..63), |
| ms70 | INTEGER(0..69), |
| ms80 | INTEGER(0..79), |
| ms128 | INTEGER(0..127), |

TABLE 1-continued

```
    ms160                                          INTEGER(0..159),
    ms256                                          INTEGER(0..255),
    ms320                                          INTEGER(0..319),
    ms512                                          INTEGER(0..511),
    ms640                                          INTEGER(0..639),
    ms1024                                         INTEGER(0..1023),
    ms1280                                         INTEGER(0..1279),
    ms2048                                         INTEGER(0..2047),
    ms2560                                         INTEGER(0..2559),
    ms5120                                         INTEGER(0..5119),
    ms10240                                        INTEGER(0..10239)
  },
  associatedCsiRSList           SEQUENCE (SIZE(1..maxNrofAssociatedCsiRS))
  OF Associated-NZP-CSI-RS   OPTIONAL,
    shortDRX                                       SEQUENCE {
      drx-ShortCycle                               ENUMERATED {
                                                     ms2, ms3, ms4, ms5, ms6, ms7, ms8,
  ms10, ms14, ms16, ms20, ms30, ms32,
                                                     ms35, ms40, ms64, ms80, ms128,
  ms160, ms256, ms320, ms512, ms640, spare9,
                                                     spare8, spare7, spare6, spare5,
  spare4, spare3, spare2, spare1 },
      drx-ShortCycleTimer                          INTEGER (1..16)
    }
  OPTIONAL,   -- Need R
    drx-SlotOffset                                 INTEGER (0..31)
  }
  Associated-NZP-CSI-RS   ::=                      SEQUENCE {
    csi-RS                                         NZP-CSI-RS-ResourceId,
    ra-OccationList               SEQUENCE (SIZE(1..maxRA-OccasionsPerCSIRS))
  OF INTEGER (0..maxRA-Occasions-1)   OPTIONAL,   -- Need R
    ra-PreambleIndex                               INTEGER         (0..63)
  OPTIONAL,   -- Need R
  ...
  }
```

Then the UE can determine a time for sleep and a time for monitoring PDCCH. The time for monitoring the PDCCH can be called DRX on duration. In a given DRX on duration, the serving gNB transmits those K CSI-RS resources in a slot that is preconfigured or configured, for example a first slot in the given DRX on duration, which is known by the UE. The UE measures those K CSI-RS resources and selects one CSI-RS resource. The UE can select the CSI-RS resource with a highest RSRP. In one example, before transmitting those K CSI-RS resources, the serving gNB can send a DCI format X to indicate whether those K CSI-RS resources are transmitted in the given DRX on duration or not. If the UE receives the DCI format X that indicates those K CSI-RS resources are transmitted in the given DRX on duration then the UE can assume that those K CSI-RS resources are transmitted in the preconfigured slot in the given DRX on duration. If the UE does not receive the DCI format X that indicates those K CSI-RS resources are transmitted in the given DRX on duration, then the UE does not receive and does not measure those K CSI-RS resources in the given DRX on duration and the UE can assume that a Tx beam applied to PDCCH in last DRX oft duration is applied to PDCCH in the given DRX on duration.

After selecting one CSI-RS resource of those K CSI-RS resources, the UE transmits the PRACH preamble on the PRACH resource occasion that is associated with the selected CSI-RS resource, where the association is determined according to the configuration received from the gNB. Then the UE can start to detect PDCCH by assuming the PDCCH transmission is quasi co-located with the selected CST-RS resource with respect to the spatial Rx parameter. In other word, the UE can start to detect PDCCH by assuming that the gNB transmits the PDCCH with the same Tx beam as the Tx beam applied on the transmission of the selected CST-RS resource in the given DRX on duration.

In the given DRX on duration, the UE can transmit a PUCCH transmission with a UE Tx beam that is used to transmit the PRACH preamble that is associated with the selected CSI-RS resource.

The benefit far this method at the beginning of each DRX on duration is that the UE is able to measure a set of Tx beams and select a 'best' Tx beam for the downlink and uplink transmission in the given DRX on duration.

SECOND EXAMPLE

A UE is configured with a DRX configuration and the UE is configured with K CSI-RS resources that are associated with a long DRX cycle configured in the DRX configuration. The 'repetition' parameter for those K CSI-RS resources is set to be 'ON' to indicate that a same Tx beam is applied to transmission in those K CSI-RS resources. The UE is configured with that those K CSI-RS resources are transmitted in one particular slot in each DRX on duration in the long DRX cycle. In one given DRX on duration, the UE can first measure those K CSI-RS resources in the preconfigured slot. Since the same Tx beam is applied on the transmission of those K CSI-RS resources, the UE can apply different Rx beams to receive each of those K CST-RS resources tea find a 'best' Rx beam tear the Tx beam used to transmit those K CSI-RS resources. In that given DRX on duration, the UE can assume that a PDCCH is transmitted with the same Tx beam that is applied to the transmission in those K CSI-RS resources in the same DRX on duration and then the UE can use the 'best' Rx beam that is learnt by measuring the transmission of those K CSI-RS resources in the same DRX on duration. The UE can also be requested to use a Tx beam that corresponds to the Rx beam that is selected based on measuring those K CSI-RS resources to transmit a PUCCH.

Figure 4:
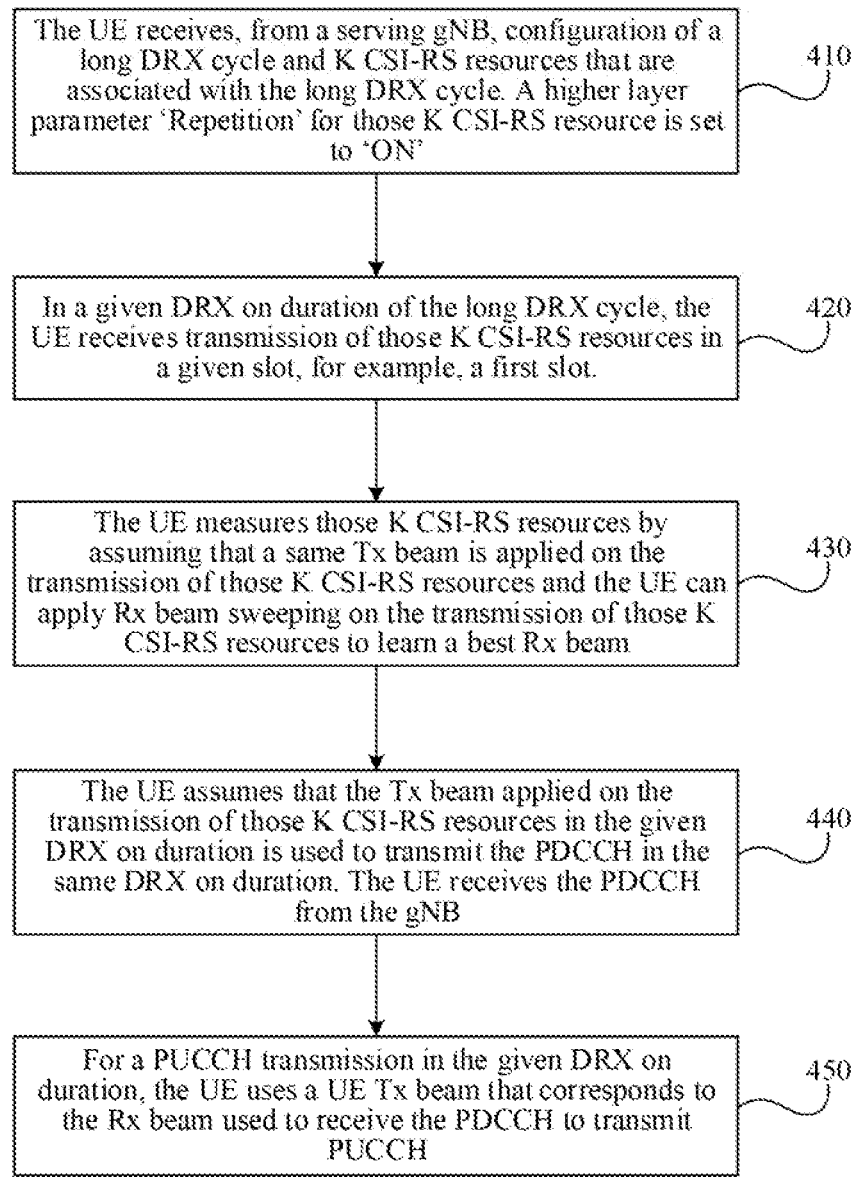
FIG. 4 is a flowchart of a UE procedure according to the embodiments of the present disclosure.

FIG. 4 is a flowchart of a UE procedure according to the embodiments of the present disclosure.

As illustrated in FIG. 4, the UE receives, from a serving RNB, configuration of a long DRX cycle and K CSI-RS resources associated with the long DRX cycle in 410. A higher layer parameter 'Repetition' for those K CSI-RS resources is set to be 'On' in the configuration received by the UE, which indicates that a same Tx beam is applied to transmission in those K CSI-RS resources. Then in 420, the UE receives the transmission of those K CSI-RS resources in a given DRX on duration of the configured long DRX cycle. In the given DRX on duration, the transmission of those K CSI-RS resources can happen in a first slot as configured by the system. In 430, the UE measures the transmission of those K CSI-RS resources in the given DRX on duration by assuming that a same Tx beam is applied to the transmission of those K CSI-RS resources. The UE can apply a Rx beam sweeping operation across the transmission of those K CSI-RS resources to find a 'best' Rx beam. To receive a PDCCH transmission in the given DRX on duration, the UE can assume that the Tx beam applied to the transmission of those K CSI-RS resources in the given DRX on duration is also applied to the PDCCH transmission in 440. Then in 450, for a PUCCH transmission in the given DRX or a duration, the UE shall use a Tx beam that corresponds to the Rx beam used to receive the PDCCH transmission to transmit that PUCCH.

Figure 5:
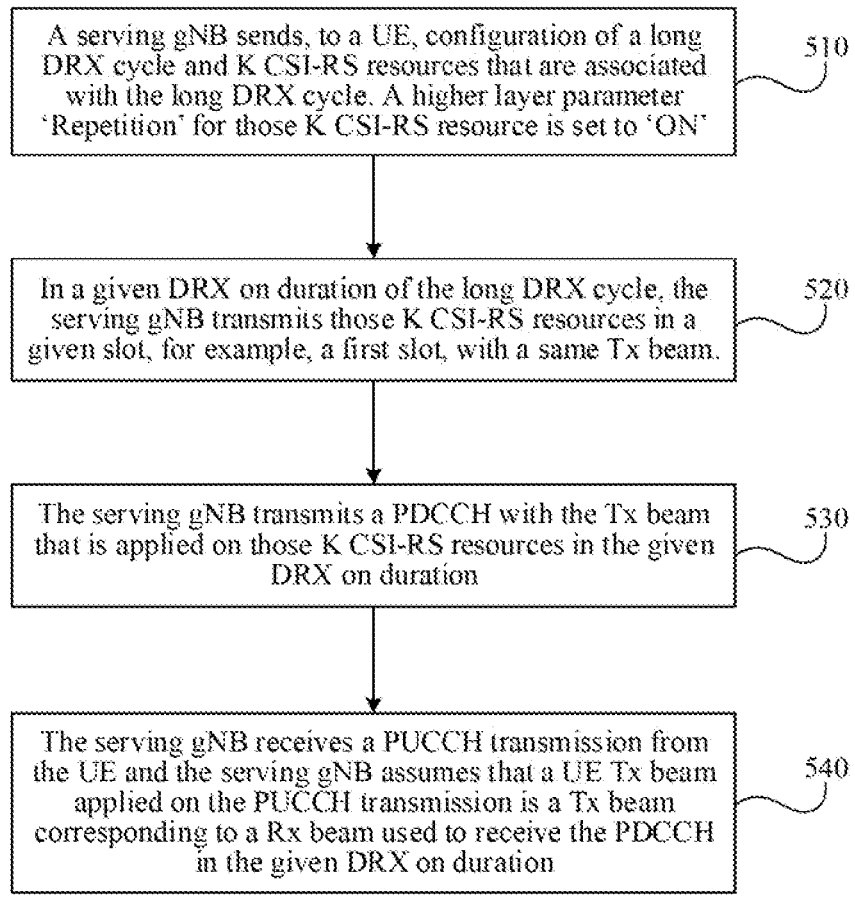
FIG. 5 is a flowchart of a network procedure according to the embodiments of the present disclosure.

FIG. 5 is a flowchart of a network procedure according to the embodiments of the present disclosure.

As illustrated in FIG. 5, a serving gNB sends, to a UE, configuration of a long DRX cycle and K CSI-RS resources associated with the long DRX cycle in 510. A higher layer parameter 'Repetition' for those K CSI-RS resources is set to be 'On' in the configuration sent to the UE, which indicates that the gNB applies a same Tx beam on transmission in those K CSI-RS resources. Then in 520, the serving gNB transmits those K CSI-RS resources in a given DRX on duration of the configured long DRX cycle and the serving gNB applies a same Tx beam on the transmission of all those K CSI-RS resources in the given DRX on duration, the transmission of those K CSI-RS resources can happen in a first slot as configured by the system. In 530, the serving gNB transmits a PDCCH with the same Tx beam that is applied on the transmission of those K CSI-RS resources in the given DRX on duration. Then in 540, the serving gNB receives a PUCCH transmission from the UE in the given DRX on duration. The serving gNB can assume that a UE Tx beam applied on the PUCCH transmission is a Tx beam that corresponds to a UE Rx beam used to receive the PDCCH in the given DRX on duration. In another word, the serving gNB can use a gNB Rx beam to receive the PUCCH transmission from the UE, which corresponds to the Tx beam applied to those K CSI-RS resources in the given DRX on duration.

Figure 6:
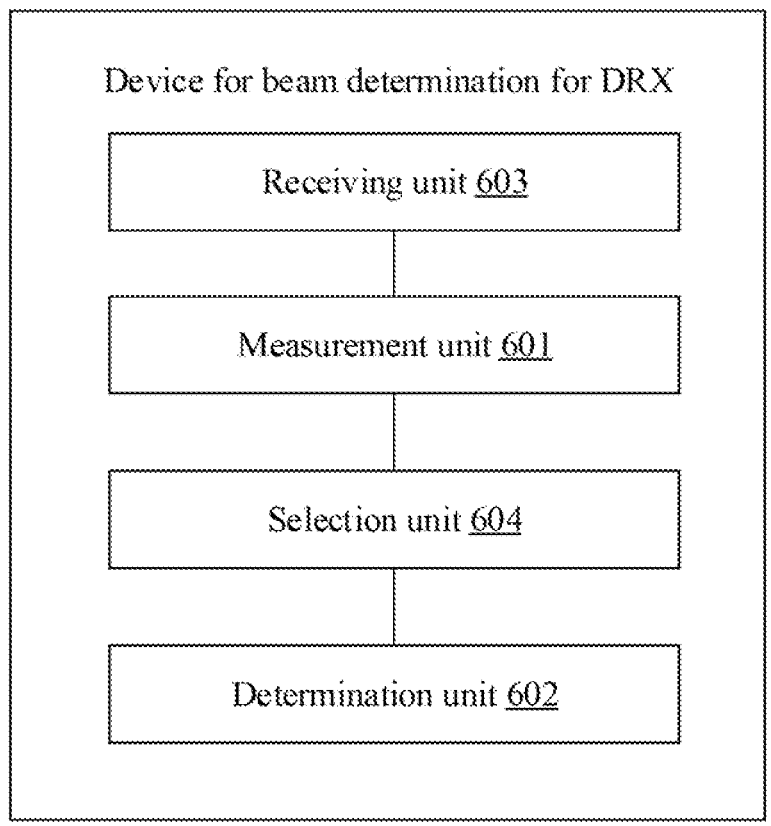
FIG. 6 is a first diagram of a structure composition of a device for beam determination for DRX according to the embodiments of the present disclosure.

FIG. 6 is a first diagram of a structure composition of a device for beam determination for DRX according to the embodiments of the disclosure. The device is for use in a UE. As illustrated in FIG. 6, the device for beam determination for DRX includes a measurement unit 601 and a determination unit 602.

The measurement unit 601 is configured to measure multiple CSI-RS resources in a given slot in a DRX on duration.

The determination unit 602 is configured to determine, based on measurement quantities, at least one of a transmitting beam for a PDCCH or a transmitting beam for a PUCCH.

In an embodiment, the device further includes a receiving unit 603, configured to receive first configuration information and second configuration information from a network device, here, the first configuration information is used to determine a DXR configuration and the second configuration information is used to determine configuration of the multiple CSI-RS resources.

Here, the DRX configuration includes configuration of a long DRX cycle, and the long DRX cycle is associated with the multiple CSI-RS resources.

In an embodiment, each of the multiple CSI-RS resources is associated with a PRACH preamble and a PRACH resource occasion.

In an embodiment, the multiple CSI-RS resources correspond to different transmitting beams, and the device further includes a selection unit 604 and a sending, unit (not illustrated in drawings).

The selection unit is configured to select, based on the measurement quantities, a first CSI-RS resource from the multiple CSI-RS resources, here, the first CSI-RS resource is associated with a first PRACH preamble and a first PRACH resource occasion.

The sending unit is configured to transmit the first PRACH preamble on the first PRACH resource occasion.

The determination unit is configured to determine at least one of: the transmitting beam for the PDCCH is the same as a transmitting beam for the first CSI-RS resource, or, the transmitting beam for the PUCCH is the same as a transmitting beam for the first PRACH preamble.

In an embodiment, the selection unit 604 is configured to select, as the first CSI-RS resource, a CSI-RS resource with a highest signal quality from the multiple CSI-RS resources.

In an embodiment, the multiple CSI-RS resources correspond to a same transmitting beans, and the measurement unit 601 is configured to measure, through beam sweeping, the multiple CSI-RS resources in the given slot in the DRX on duration. Here, the beam sweeping indicates that the UE receives different CSI-RS resources trough different receiving beams among multiple receiving beams.

In an embodiment, the device further includes a selection unit 604.

The selection unit 604 is configured to select, based on the measurement quantities, a first receiving beam from the multiple receiving beams.

The determination unit 602 is configured to determine at least one of the transmitting beam for the PDCCH is the same as the transmitting beam for the multiple CSI-RS resources, or, the transmitting beam for the PUCCH corresponds to the first receiving beam.

In an embodiment, the selection unit 604 is configured to select, as the first receiving beam, a receiving beam with a highest signal quality from the multiple receiving beams.

In an embodiment, the device further includes a receiving unit 603, configured to receive a first DCI format, here, the first DCI format indicates that the multiple CSI-RS resources are transmitted in the DRX on duration.

In an embodiment, the given slot is a first slot in the DRX on duration.

Those skilled in the art should understand that the descriptions related to the device for beans determination fir DRX in the embodiments of the present disclosure can be understood with reference to the descriptions related to the method for beam determination for DRX in the embodiments of the present disclosure.

Figure 7:
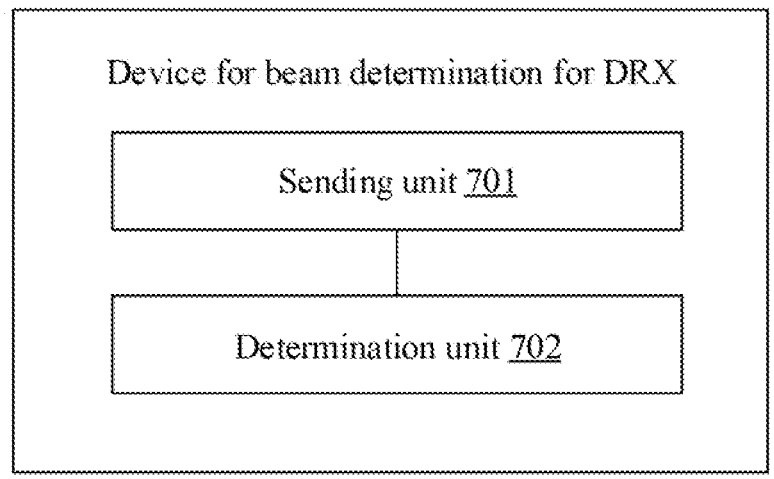
FIG. 7 is a second diagram of a structure composition of a device for beam determination for DRX according to the embodiments of the present disclosure.

FIG. 7 is a second diagram of a structure composition of a device for beam determination for DRX according to the embodiments of the disclosure. The device is for use in a network device. As illustrated in FIG. 7, the device for beam determination for DRX includes a sending unit 701.

The sending unit 701 is configured to transmit multiple CSI-RS resources in a given slot in a DRX on duration. Here, measurement quantities of the multiple CSI-RS resources are used by a UE to determine at least one of a transmitting beam for a PDCCH or a transmitting beam for a PUCCH.

In an embodiment, the sending unit 701 is further configured to transmit first configuration information and second configuration information to the UE, and the first configuration information is used to determine a DRX configuration and the second configuration information is used to determine configuration of the multiple CSI-RS resources.

Here, the DRX configuration includes configuration of a long DRX cycle, and the long DRX cycle is associated with the multiple CSI-RS resources.

In an embodiment, the multiple CSI-RS resources correspond to different transmitting beams, and the device further includes a receiving unit (not illustrated in drawings) and a determination unit 702.

The receiving unit is configured to receive a first PRACH preamble transmitted by the UE on a first PRACH resource occasion; here, the first PRACH resource occasion and the first PRACH preamble are associated with a first CSI-RS resource among the multiple CSI-RS resources.

The determination unit 702 is configured to determine at least one of: the transmitting beam for the PDCCH is the same as a transmitting beam for the first CSI-RS resource, or, the transmitting beam for the PUCCH is the same as a transmitting beam for the first PRACH preamble.

In an embodiment, the multiple CSI-RS resources correspond to a same transmitting, beam, and the device further includes a determination unit 702.

The determination unit 702 is configured to determine at least one of the transmitting beam for the PDCCH is the same as the transmitting beam for the multiple CSI-RS resources, or, the transmitting beam for the PUCCH corresponds to the transmitting beam for the multiple CSI-RS resource. Here, it should be noted that the transmitting beam for the PUCCH corresponds to a receiving beam for the PUCCH and the receiving beam for the PUCCH corresponds to the transmitting beam for the multiple CSI-RS resources, and thus the transmitting beam for the PUCCH corresponds to the transmitting beam for the multiple CSI-RS resources.

In an embodiment, the sending unit 701 is further configured to transmit a first DCI format to the UE, here, the first DCI format indicates that the multiple CSI-RS resources are transmitted in the DRX on duration.

In an embodiment, the given slot is a first slot in the DRX on duration.

Those skilled in the art should understand that the descriptions related to the device for beam determination for DRX in the embodiments of the present disclosure can be understood with reference to the descriptions related to the method for beam determination for DRX in the embodiments of the present disclosure.

Figure 8:
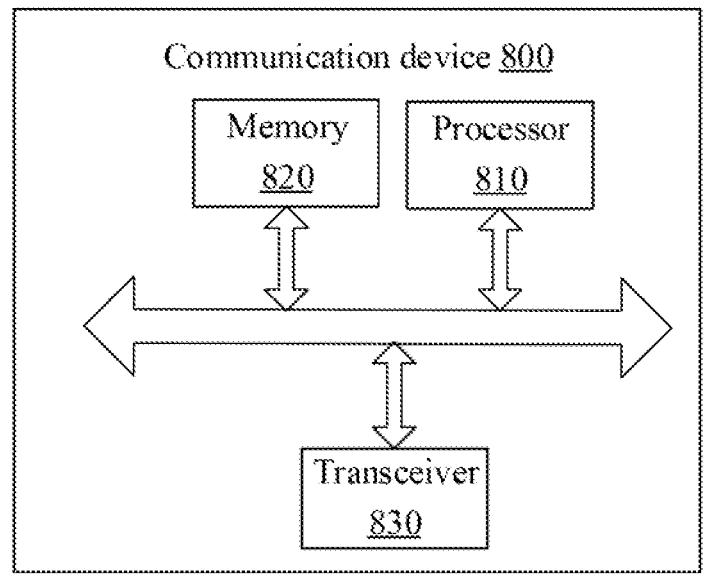
FIG. 8 is a structure diagram of a communication device according to the embodiments of the present disclosure.

FIG. 8 is a structural diagram of a communication device 800 according to the embodiments of the present disclosure. The communication device may be a UE, or may be a network device. The communication device 800 as illustrated in FIG. 8 includes a processor 810 configured to call and execute computer programs in a memory to perform the methods in the embodiments of the present disclosure.

Optionally, as illustrated in FIG. 8, the communication device 800 further includes a memory 820. The processor 810 may be configured to call and execute computer programs in the memory 820 to perform the methods in the embodiments of the present disclosure.

Here, the memory 820 may be a separate device independent of the processor 810, or may be integrated into the processor 810.

Optionally, as illustrated in FIG. 8, the communication device 800 further includes a transceiver 830. The processor 810 may control the transceiver 830 to perform communication with another device, so as to transmit information or data to the another device or receive information or data from the another device.

Here, the transceiver 830 may include a transmitter and a receiver. The transceiver 830 may further include an antenna, and the number of antennas may be one or more.

Optionally, the communication device 800 may be a network device in the embodiments of the present disclosure, and the communication device 800 may implement the corresponding processes implemented by the network device in various methods of the embodiments of the present disclosure. For simplicity, details are not described herein again.

Optionally, the communication device 800 may be a mobile terminal/UE in the embodiments of the present disclosure, and the communication device 800 may implement the corresponding processes implemented by the mobile terminal/UE in various methods of the embodiments of the present disclosure. For simplicity, details are not described herein again.

Figure 9:
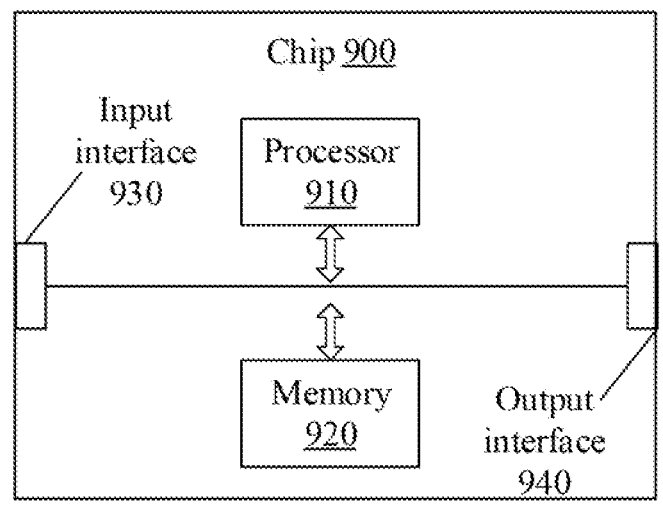
FIG. 9 is a structure diagram of a chip according to the embodiments of the present disclosure.

FIG. 9 is a structural diagram of a chip according to the embodiments of the present disclosure. As illustrated in FIG. 9. The chip 900 includes a processor 910 configured to call and execute computer programs in a memory to perform the methods in the embodiments of the present disclosure.

Optionally, as illustrated in FIG. 9, the chip 900 further includes a memory 920. The processor 910 may be configured to call and execute computer programs in the memory 920 to perform the methods in the embodiments of the present disclosure.

Here, the memory 920 may be a separate device independent of the processor 910, or may be integrated into the processor 910.

Optionally, the chip 900 may farther include an input interface 930. The processor 910 may control the input interface 930 to communicate with another device or chip, so as to obtain information or data from the another device or chip.

Optionally, the chip 900 may further include an output interface 940. The processor 910 may control the output interface 940 to communicate with another device or chip so as to output information or data to the another device or chip.

Optionally, the chip may be applied to the network device in the embodiments of the present disclosure, and the chip may implement the corresponding processes implemented by the network device in various methods of the embodiments of the present disclosure. For simplicity, details are not described herein again.

Optionally, the chip may be applied to the mobile terminal/UE in the embodiments of the present disclosure, and the chip may implement the corresponding processes implemented by the mobile to in various methods of the embodiments of the present disclosure. For simplicity, details are not described herein again.

It should be understood that the chip in the embodiments of the present application may also be called as a system-level chip, a system chip, a chip system or a system-on-chip.

Figure 10:
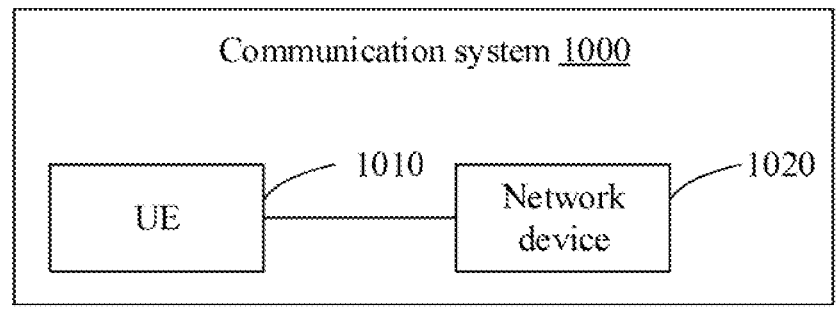
FIG. 10 is a block diagram of a communication system according to the embodiments of the present disclosure.

FIG. 10 is a block diagram of a communication system 1000 according to the embodiments of the present disclosure. As illustrated, in FIG. 10, the communication system 1000 includes a UE 1010 and a network device 1020.

Here, the UE 1010 may be configured to perform the corresponding functions implemented by the UE in the above methods; and the network device 1020 may be configured to perform the corresponding functions implemented by the network device in the above methods. For simplicity, details are not described herein again.

It should be understood that the processor in the embodiments of the disclosure may be an integrated circuit chip and has a signal processing capability. In the implementation process, each operation of the foregoing method embodiments may be completed by an integrated logic circuit of hardware in a processor or instructions in a form of software in a processor. The above processor may be a general-purpose processor, a Digital Signal Processor (DSP), an Application Specific Integrated Circuit (ASIC), a Field Programmable Gate Array (FPGA) or another Programming logic devices, a discrete gate or transistor logic device, a discrete hardware component, or the like. Various methods, operations, and logical blocks disclosed in the embodiments of the present disclosure can be implemented or executed general-purpose processor may be a microprocessor or the processor may be any conventional processor or the like. The operations of the methods disclosed in combination with the embodiments of the present disclosure may be directly implemented by a hardware decoding processor, or may be implemented by a combination of hardware and software modules in the decoding processor. The software modules may be located in a mature storage medium in the art, such as a Random Access Memory (RAM), a flash memory, a Read-Only Memory (ROM), a Programmable Read-Only Memory (PROW an Erasable Programmable Read-Only Memory (EPROM), an Electrically Erasable Programmable Read-Only Memory (EEPROM), a register, and the like. The storage medium is located in a memory, and the processor reads the information in the memory and completes the operations of the foregoing methods in combination with the hardware of the processor.

It should be understood that the memory in the embodiments of the present disclosure may be a volatile memory or a non-volatile memory, or may include the volatile memory and the non-volatile memory. The non-volatile memory may be a ROM, a PROM, an EPROM, EEPROM or a flash memory, or the like. The volatile memory may be a RAM, which is used as an external cache. By way of example, but not limitation, many forms of RAMs are available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include, but is not limited to, these and any other suitable types of memory.

It should be understood that the above memory are exemplary but not restrictive. For example, the memory in the embodiments of the present disclosure may also be a Static RAM (SRAM), a Dynamic RAM (DRAM), Synchronous dynamic random access memory (synchronous DRAM, SDRAM), double data rate synchronous dynamic random access memory (double data rate SDRAM, DDR SDRAM), enhanced synchronous dynamic random, access memory (enhanced SDRAM, ESDRAM), synchronous connection Dynamic random access memory (synch link DRAM, SLDRAM) and direct memory bus random access memory (Direct Rambus RAM, DR RAM), etc. That is, the memories in the embodiments of the present application are intended to include, but not limited to, these and any other suitable types of memories.

The embodiments of the present disclosure further provide a computer-readable storage medium for storing computer programs.

Optionally, the computer-readable storage medium may be applied to the network device in the embodiments of the present disclosure, and the computer programs cause a computer to execute the corresponding processes implemented by the network device in each method in the embodiments of the present disclosure. For simplicity, details are not described herein again.

Optionally, the computer-readable storage medium may be applied to the mobile terminal/LT in the embodiments of the present disclosure, and the computer programs cause a computer to execute the corresponding processes implemented by the mobile terminal/LT in each method in the embodiments of the present disclosure. For simplicity, details are not described herein again.

The embodiments of the present disclosure further provide a computer program product including computer program instructions.

Optionally, the computer program product can be applied to the network device in the embodiments of the present disclosure, and the computer program instructions cause a computer to execute the corresponding processes implemented by the network device in each method in the embodiments of the present disclosure. For simplicity, details are not described herein again.

Optionally, the computer program product can be applied to the mobile terminal/UE in the embodiments of the present disclosure, and the computer program instructions cause a computer to execute the corresponding processes implemented by the mobile terminal/UE in each method in the embodiments of the present disclosure. For simplicity, details are not described herein again.

The embodiments of the present disclosure further provide a computer program.

Optionally, the computer program can be applied to the network device in the embodiments of the present disclosure, and when run on a computer, causes the computer to execute the corresponding processes implemented by the network device in each method in the embodiments of the present disclosure. For simplicity, details are not described herein again.

Optionally, the computer program can be applied to the mobile terminal/UE in the embodiments of the present disclosure, and when run on a computer, causes the computer to execute the corresponding processes implemented by the mobile terminal/UE in each method in the embodiments of the present disclosure. For simplicity, details are not described herein again.

A person of ordinary skill in the art may be aware that example, units and algorithm operations described in combination with the embodiments of in present disclosure play be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, detailed working processes of the foregoing system, device, and unit may refer to corresponding processes in the foregoing method embodiments, and details are not described herein again.

In the several embodiments provided in the present disclosure, it should be understood that the disclosed system, device, and method may be implemented in other manners. For example, the described device embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the solutions of the embodiments of the disclosure.

In addition, functional units in the embodiments of the present disclosure may be integrated into one processing unit, or each of the units may exist alone physically, or two or more units ale integrated into one unit.

When the functions are implemented in the form of a software functional unit and sold or used as an independent product, the functions may be stored in a computer-readable storage medium. Based GB such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device, or the like) to perform all or some of the operations described in the embodiments of the disclosure. The foregoing storage medium includes: any medium that can store program codes, such as a USB flash drive, a removable hard disk, a ROM, a RAM, a magnetic disk, or a compact disc.

The foregoing descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the present disclosure. Therefore, the scope of protection of the present disclosure shall be subject to the scope of protection of the claims.

The invention claimed is:

1. A method for beam determination for Discontinuous reception (DRX), comprising:
measuring, by User Equipment (UE), a plurality of Channel State Information Reference Signal (CSI-RS) resources in a given slot in a DRX on duration, wherein the given slot is a first slot in the DRX on duration; and
determining, by the UE, at least one of a transmitting beam for a Physical Downlink Control Channel (PDCCH) or a transmitting beam for a Physical Uplink Control Channel (PUCCH), based on measurement quantities.

2. The method of claim 1, further comprising:
receiving, by the UE, first configuration information and second configuration information from a network device, the first configuration information being used to determine a DRX configuration and the second configuration information being used to determine configuration of the plurality of CSI-RS resources;
wherein the DRX configuration comprises configuration of a long DRX cycle, and the long DRX cycle is associated with the plurality of CSI-RS resources.

3. The method of claim 2, wherein each of the plurality of CSI-RS resources is associated with a Physical Random Access Channel (PRACH) preamble and a PRACH resource occasion.

4. The method of claim 3, wherein the plurality of CSI-RS resources correspond to different transmitting beams; and
determining, by the UE, the at least one of the transmitting beam for the PDCCH or the transmitting beam for the PUCCH, based on the measurement quantities comprises:
selecting, by the UE, a first CSI-RS resource from the plurality of CSI-RS resources based on the measurement quantities, wherein the first CSI-RS resource is associated with a first PRACH preamble and a first PRACH resource occasion; and
transmitting, by the UE, the first PRACH preamble on the first PRACH resource occasion, and determine at least one of: the transmitting beam for the PDCCH is the same as a transmitting beam for the first CSI-RS resource or the transmitting beam for the PUCCH is the same as a transmitting beam for the first PRACH preamble.

5. The method of claim 4, wherein selecting, by the UE, the first CSI-RS resource from the plurality of CSI-RS resources based on the measurement quantities comprises:
selecting, by the UE, as the first CSI-RS resource, a CSI-RS resource with a highest signal quality from the plurality of CSI-RS resources.

6. The method of claim 2, wherein the plurality of CSI-RS resources correspond to a same transmitting beam; and
measuring, by the UE, the plurality of CSI-RS resources in the given slot in the DRX on duration comprises:
measuring, by the UE, through beam sweeping, the plurality of CSI-RS resources in the given slot in the DRX on duration, wherein the beam sweeping indicates that the UE receives different CSI-RS resources through different receiving beams among a plurality of receiving beams.

7. The method of claim 6, wherein determining, by the UE, the at least one of the transmitting beam for the PDCCH or the transmitting beam for the PUCCH, based on the measurement quantities comprises:
selecting, by the UE, a first receiving beam from the plurality of receiving beams based on the measurement quantities; and
determining, by the UE, at least one of: the transmitting beam for the PDCCH is the same as the transmitting beam for the plurality of CSI-RS resources or the transmitting beam for the PUCCH corresponds to the first receiving beam.

8. The method of claim 7, wherein selecting, by the UE, the first receiving beam from the plurality of receiving beams based on the measurement quantities comprises:

selecting, by the UE, as the first receiving beam, a receiving beam with a highest signal quality from the plurality of receiving beams.

9. The method of claim 1, further comprising:
receiving, by the UE, a first Downlink Control Information (DCI) format, the first DCI format being used to indicate that the plurality of CSI-RS resources are transmitted in the DRX on duration.

10. A device for beam determination for Discontinuous reception (DRX), for use in User Equipment (UE), comprising:
a processor; and
a memory, storing computer program comprising instructions that, when executed by the processor, cause the processor to:
measure a plurality of Channel State Information Reference Signal (CSI-RS) resources in a given slot in a DRX on duration, wherein the given slot is a first slot in the DRX on duration; and
determine, based on measurement quantities, at least one of a transmitting beam for a Physical Downlink Control Channel (PDCCH) or a transmitting beam for a Physical Uplink Control Channel (PUCCH).

11. The device of claim 10, further comprising:
a transceiver, configured to receive first configuration information and second configuration information from a network device, the first configuration information being used to determine a DRX configuration and the second configuration information being used to determine configuration of the plurality of CSI-RS resources;
wherein the DRX configuration comprises configuration of a long DRX cycle, and the long DRX cycle is associated with the plurality of CSI-RS resources.

12. The device of claim 11, wherein each of the plurality of CSI-RS resources is associated with a Physical Random Access Channel (PRACH) preamble and a PRACH resource occasion.

13. The device of claim 12, wherein the plurality of CSI-RS resources correspond to different transmitting beams; and
wherein the processor is configured to select a first CSI-RS resource from the plurality of CSI-RS resources based on the measurement quantities, wherein the first CSI-RS resource is associated with a first PRACH preamble and a first PRACH resource occasion;

the transceiver is configured to transmit the first PRACH preamble on the first PRACH resource occasion; and
the processor is configured to determine at least one of: the transmitting beam for the PDCCH is the same as a transmitting beam for the first CSI-RS resource or the transmitting beam for the PUCCH is the same as a transmitting beam for the first PRACH preamble.

14. The device of claim 13, wherein the processor is configured to select, as the first CSI-RS resource, a CSI-RS resource with a highest signal quality from the plurality of CSI-RS resources.

15. The device of claim 11, wherein the plurality of CSI-RS resources correspond to a same transmitting beam; and
the processor is configured to measure, through beam sweeping, the plurality of CSI-RS resources in the given slot in the DRX on duration, wherein the beam sweeping indicates that the UE receives different CSI-RS resources through different receiving beams among a plurality of receiving beams.

16. The device of claim 15, wherein
the processor is configured to select a first receiving beam from the plurality of receiving beams based on the measurement quantities; and determine at least one of: the transmitting beam for the PDCCH is the same as the transmitting beam for the plurality of CSI-RS resources or the transmitting beam for the PUCCH corresponds to the first receiving beam.

17. The device of claim 16, wherein the processor is configured to select, as the first receiving beam, a receiving beam with a highest signal quality from the plurality of receiving beams.

18. The device of claim 10, further comprising:
a transceiver, configured to receive a first Downlink Control Information (DCI) format, the first DCI format being used to indicate that the plurality of CSI-RS resources are transmitted in the DRX on duration.

19. The method of claim 1, wherein the given slot is configured by a network device, or preconfigured, or specified by a protocol.

20. The device of claim 10, wherein the given slot is configured by a network device, or preconfigured, or specified by a protocol.

* * * * *